United States Patent
Tanaka et al.

(10) Patent No.: US 7,490,515 B2
(45) Date of Patent: Feb. 17, 2009

(54) LIQUID LEVEL MEASURING SYSTEM

(75) Inventors: Kenichi Tanaka, Shimada (JP);
Toshiaki Fukuhara, Shimada (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/088,747

(22) Filed: Mar. 25, 2005

(65) Prior Publication Data

US 2005/0217366 A1 Oct. 6, 2005

(30) Foreign Application Priority Data

Mar. 25, 2004 (JP) .................... P2004-089646

(51) Int. Cl.
*G01F 23/30* (2006.01)
*G01F 23/00* (2006.01)
(52) U.S. Cl. ..................... 73/314; 73/290 R
(58) Field of Classification Search ............ 73/290 R, 73/314, 317
See application file for complete search history.

(56) References Cited

U.S. PATENT DOCUMENTS

| | | | | |
|---|---|---|---|---|
| 4,044,355 A | * | 8/1977 | Edvardsson | ............ 342/124 |
| 4,205,303 A | * | 5/1980 | Barnhart | ............ 341/144 |
| 4,419,657 A | * | 12/1983 | Gagnon | ............ 341/127 |
| 4,638,228 A | * | 1/1987 | Junginger et al. | ............ 318/569 |
| 4,784,001 A | * | 11/1988 | Gaertner | ............ 73/861.12 |
| 5,272,919 A | * | 12/1993 | Herm | ............ 73/295 |
| 6,138,508 A | * | 10/2000 | Hannan et al. | ............ 73/304 C |
| 2001/0006371 A1 | * | 7/2001 | Bolz | ............ 341/152 |
| 2005/0217366 A1 | * | 10/2005 | Tanaka et al. | ............ 73/290 |

FOREIGN PATENT DOCUMENTS

| | | | | |
|---|---|---|---|---|
| DE | 2952311 | A | * | 7/1981 |
| JP | 61296218 | A | | 12/1986 |
| JP | 07183779 | A | * | 7/1995 |
| JP | 08-114488 | A | | 5/1996 |
| JP | 08-292206 | A | | 11/1996 |
| JP | 2001-171366 | A | | 6/2001 |

\* cited by examiner

*Primary Examiner*—Hezron Williams
*Assistant Examiner*—John Fitzgerald
(74) *Attorney, Agent, or Firm*—Sughrue Mion, PLLC

(57) ABSTRACT

A non-contact type sensor that measures a liquid level in a non-contact fashion and outputs a measured value as a digital pulse is provided. Then, a sensor-output converting circuit is caused to input the digital pulse, which is output from the non-contact type sensor, into an existing central processing unit as an analogue voltage that corresponds to a duty factor of the digital pulse.

12 Claims, 7 Drawing Sheets

| INPUT<br>(DUTY FACTOR: %) | OUTPUT<br>(ANALOG VOLTAGE: %) |
|---|---|
| 10 | 4.75 |
| 20 | 4.19 |
| 30 | 3.63 |
| 40 | 3.12 |
| 50 | 2.62 |
| 60 | 2.11 |
| 70 | 1.64 |
| 80 | 1.18 |
| 90 | 0.69 |

| SCALE | RESISTANCE VALUE (Ω) | CPU INPUT | CAPACITY (L) | SWING ANGLE |
|---|---|---|---|---|
| SENDER F | 4.000 | 0.273 | 85.30 | 95.0 |
|  | 4.363 | 0.293 | 85.30 | 94.2 |
|  | 4.666 | 0.313 | 84.84 | 93.3 |
|  | ⋮ | ⋮ | ⋮ | ⋮ |
| METER F | 13.860 | 0.859 | 78.35 | 90.0 |
|  | 14.215 | 0.879 | 78.05 | 89.8 |
|  | 14.573 | 0.898 | 77.75 | 89.0 |
|  | ⋮ | ⋮ | ⋮ | ⋮ |
| METER 3/4 | 36.516 | 1.914 | 62.13 | 67.5 |
|  | 37.014 | 1.934 | 61.72 | 66.7 |
|  | 37.515 | 1.953 | 61.31 | 65.8 |
|  | ⋮ | ⋮ | ⋮ | ⋮ |

PRIOR ART

FIG. 13

| SCALE | DUTY FACTOR (%) | CAPACITY (L) | SWING ANGLE |
|---|---|---|---|
| SENDER F | 90.0 | 85.30 | 95.0 |
|  | 89.5 | 85.30 | 94.2 |
|  | 89.0 | 84.84 | 93.3 |
|  | ⋮ | ⋮ | ⋮ |
| METER F | 85.0 | 78.35 | 90.0 |
|  | 84.5 | 78.05 | 89.8 |
|  | 84.0 | 77.75 | 89.0 |
|  | ⋮ | ⋮ | ⋮ |
| METER 3/4 | 67.5 | 62.13 | 67.5 |
|  | 67.0 | 61.72 | 66.7 |
|  | 66.5 | 61.13 | 65.8 |
|  | ⋮ | ⋮ | ⋮ |

LIQUID LEVEL MEASURING SYSTEM

BACKGROUND OF THE INVENTION

The present invention relates to a liquid level measuring system for measuring a residual quantity of a liquid such as a fuel stored in a tank.

The vehicle that uses a gasoline as the fuel to drive is equipped with a tank that stores the fuel. A fuel gauge used to check a remaining fuel in the tank all the time (referred to as a "liquid level gauge" hereinafter) is mounted on a dashboard. This liquid level gauge is operated based on an output of a resistance type liquid level sensor (referred simply to as a "resistance type sensor" hereinafter) that has a simple structure and is available inexpensively (see Patent Literature 1, for example).

Figure 6:
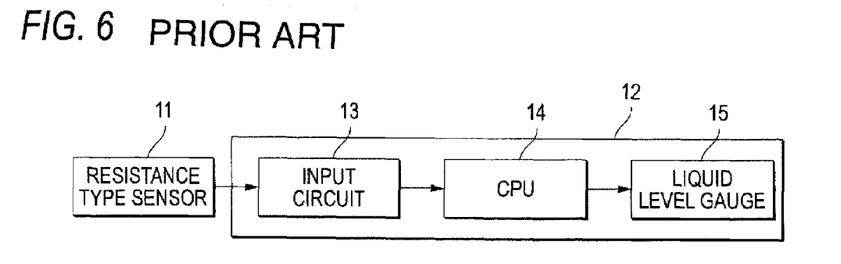
FIG. 6 is a block diagram showing a liquid level measuring system in the prior art.

FIG. 6 is a block diagram showing a liquid level measuring system including such resistance type sensor and the liquid level gauge in the prior art. This liquid level measuring system is constructed by connecting a measuring device main body 12 to a resistance type sensor 11 via a cord, or the like. The measuring device main body 12 consists of an input circuit 13, a central processing unit (abbreviated as "CPU" hereinafter) 14, and a liquid level gauge 15.

Figure 7:
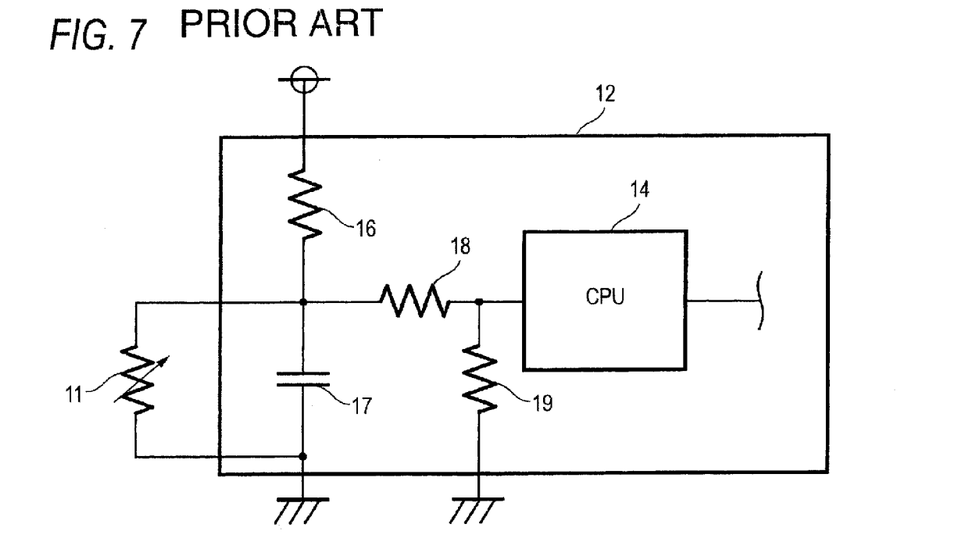
FIG. 7 is a circuit diagram showing details of an input circuit in FIG. 6.

Details of the resistance type sensor 11 and the input circuit 13 are given as shown in FIG. 7. The resistance type sensor 11 consists of a moving contact that is operated together with a float arm that is floating on the liquid surface in the tank, for example, and a resistor that outputs a resistance value in response to its contact position when the moving contact moves and contacts the resistor, i.e., outputs a change of the voltage. In FIG. 7, the resistance type sensor 11 is illustrated in the form of a variable resistance.

The input circuit 13 functions to convert a change of the resistance value of the resistance type sensor 11 into the change of the output voltage. This input circuit 13 consists of a pull-up resistor 16 provided on the power supply side, a voltage smoothing capacitor 17, and resistors 18, 19 in combination.

The CPU 14 converts/processes an analog output voltage of the input circuit 13 into a digital pulse that corresponds to a swing angle of an indicator of the liquid level gauge 15. This process of converting the voltage into the digital pulse responding to the swing angle of the indicator in the CPU 14 is carried out by referring to a data table that is prepared in advance in a memory, or the like.

Figure 8:
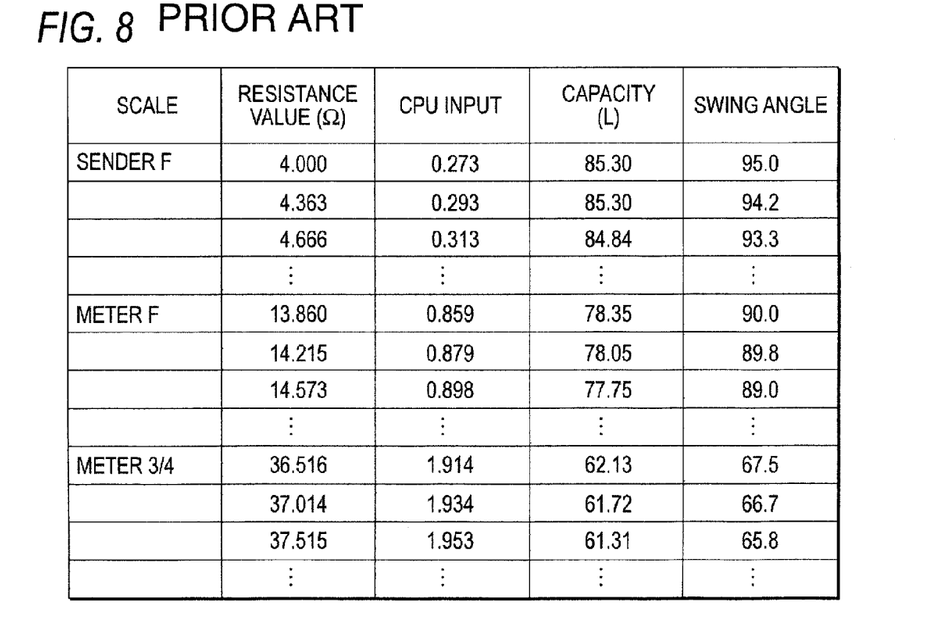
FIG. 8 is a data table showing data contents stored in a memory in a measuring device main body in FIG. 6.

This data table has a format shown in FIG. 8, for example. A capacity (residual quantity) and a swing angle of the indicator in regarding to the resistance value of the variable resistor 16 and the input voltage value of the CPU 14 are listed in a tabular form every sender F, meter F, and meter 3/4.

Figures 9A, 9B, 9C:
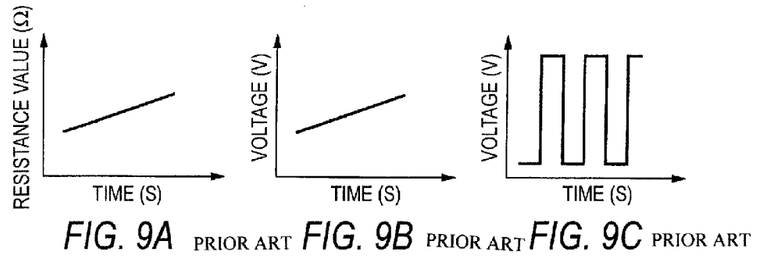
FIGS. 9A to 9C are timing charts of signals of respective circuit portions in FIG. 7.

Therefore, in this liquid level measuring system, as shown in FIG. 9A, the input circuit 13 outputs an analogue voltage in response to a change of the resistance value of the variable resistor as the resistance type sensor 11. As shown in FIG. 9B, this analogue voltage is in proportion to the change of the resistance value. As shown in FIG. 9C, the CPU 14 converts this analogue voltage into a digital pulse to operate the indicator of the liquid level gauge 15. As a result, the liquid level gauge 15 is able to indicate the liquid level.

Meanwhile, in the liquid level measuring system using such resistance type sensor, in some cases the correct measured results cannot be attained owing to the defective contact between the moving contact and the resistor, the earth (GND) floating, the connector contact failure, or the like.

For this reason, the liquid level measuring system of the non-contact and digital pulse output type, which does not have a contact mechanism consisting of the moving contact and the resistor, has been proposed in the prior art.

Figure 10:
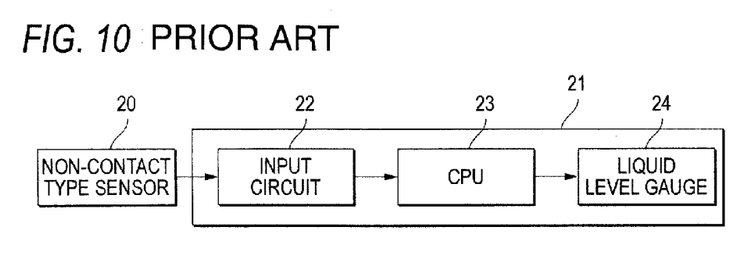
FIG. 10 is a block diagram showing another liquid level measuring system in the prior art.

FIG. 10 is a block diagram showing a liquid level measuring system of the non-contact and digital pulse output type in the prior art. This liquid level measuring system is constructed by connecting a measuring device main body 21 to a non-contact type sensor 20 via a cord, or the like. The measuring device main body 21 includes an input circuit 22, a CPU 23, and a liquid level gauge 24.

Figure 11:
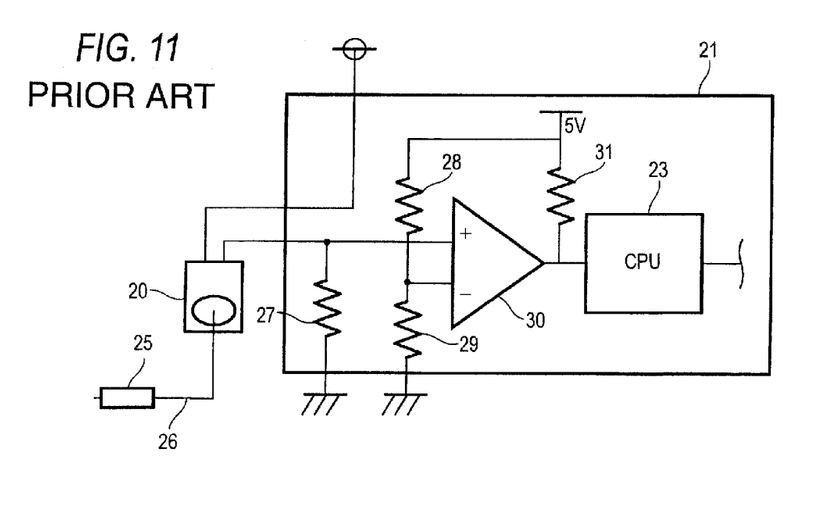
FIG. 11 is a circuit diagram showing details of an input circuit in FIG. 10.

Details of the non-contact type sensor 20 and the input circuit 22 are given as shown in FIG. 11. Out of these elements, the non-contact type sensor 20, although not shown, is composed of a Hall IC and a magnet that is turned (moved) around this Hall IC. This magnet is fitted to an L-shaped arm 26 that has a float 25 at its top end.

Therefore, in this non-contact type sensor 20, a movement of the float 25 that moves vertically in response to the liquid level in the tank is transferred to the magnet via the L-shaped arm 26. The Hall IC functions to output a digital pulse a duty factor of which can respond to the movement (amount of turn) of the magnet.

This non-contact type sensor 20 senses a change of the liquid level as a magnetic change, then processes this sensed signal in a digital (PWM) fashion, and then outputs the resultant signal.

The input circuit 22 consists of a load resistor 27 used to extract a digital pulse voltage from a current output of the Hall IC constituting the non-contact type sensor 20, voltage-dividing resistors 28, 29 for generating a reference voltage from the power supply voltage, and a voltage-level converting portion 30 for comparing an output voltage of the Hall IC with the reference voltage. A pull-up resistor 31 is connected to the input side of the CPU 23.

The CPU 23 serves to convert the digital pulse output from the input circuit 22 into a digital pulse that responds to a swing angle of the indicator in the liquid level gauge 24. The digital pulse converting process is carried out by the CPU 23 in compliance with the data table that is prepared previously in the memory, or the like.

Figure 13:
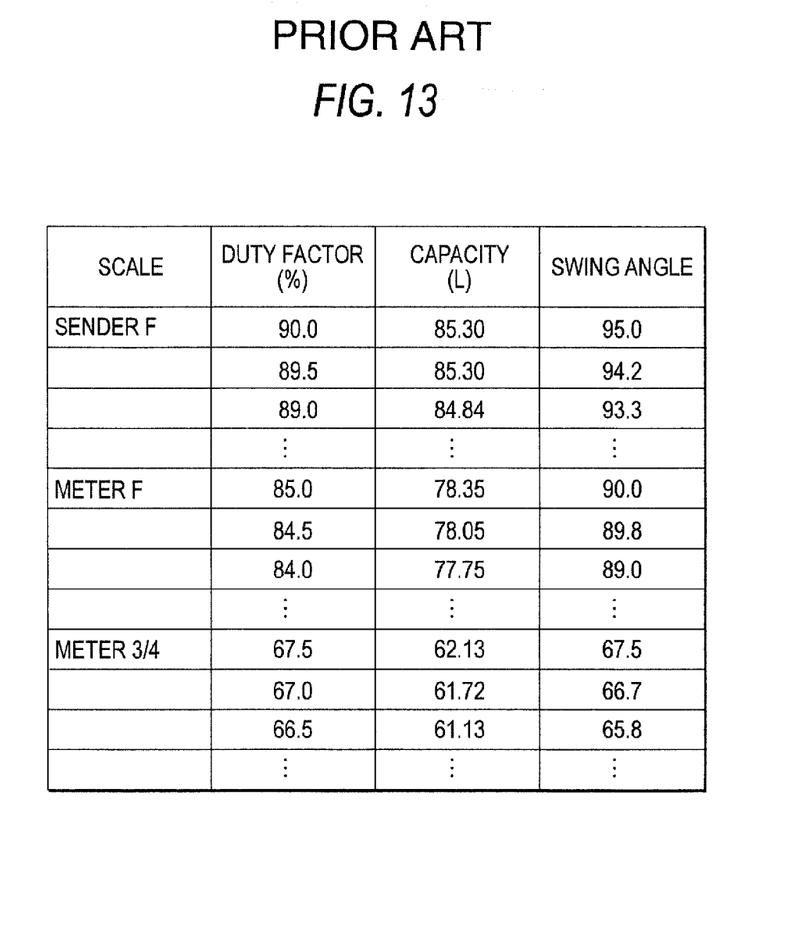
FIG. 13 is a data table showing data contents stored in a memory in a measuring device main body in FIG. 10.

This data table has a format shown in FIG. 13, for example. The capacity and the swing angle of the indicator in regarding to the duty factor of the digital pulse input into the CPU are listed in a tabular form.

Figure 12A:
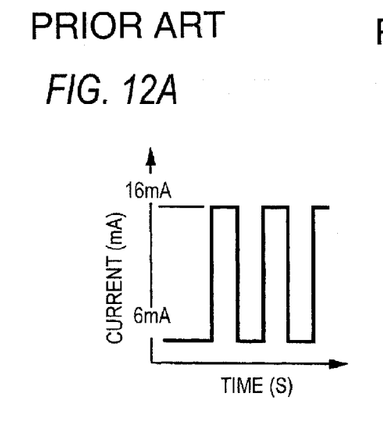
FIGS. 12A to 12D are timing charts of signals of respective circuit portions in FIG. 11.
Figure 12B:
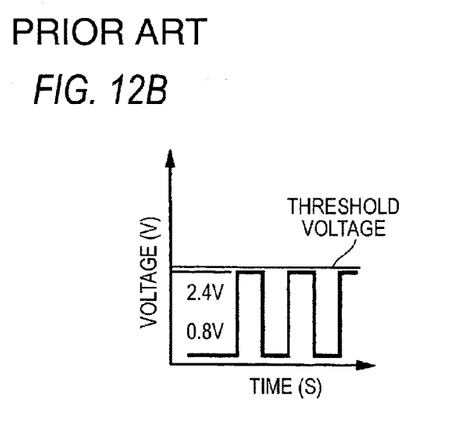

Therefore, in this liquid level measuring system, as shown in FIG. 12A, the Hall IC outputs a digital pulse current based on an output of the Hall element. Then, as shown in FIG. 12B, this digital pulse current is converted into the digital pulse voltage by using the load resistor 27. At that time, a level of the digital pulse voltage is set near a predetermined threshold voltage level (2.4 V).

Figures 12C, 12D:
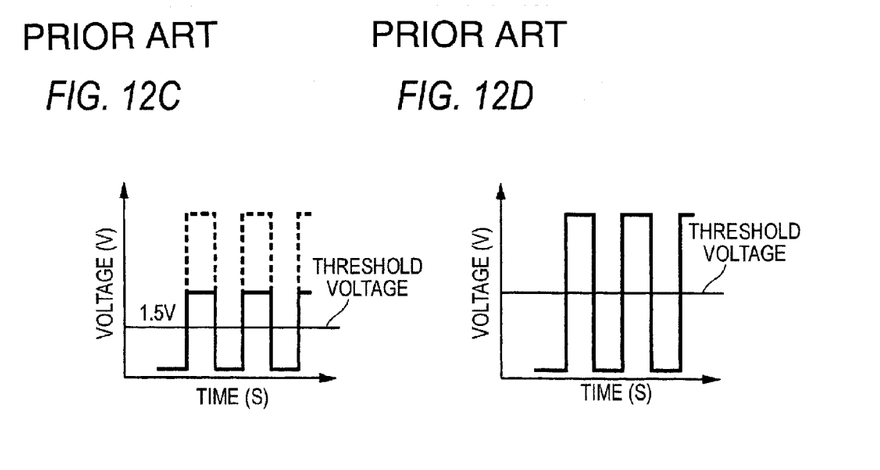

Then, the digital pulse voltage that is subjected to the level adjustment is input into the voltage-level converting portion 30, and is compared with a reference voltage there (FIG. 12C). Then, as shown in FIG. 12D, only the digital pulse voltage that is in excess of this reference voltage is amplified up to a predetermined voltage level by the operation of the CPU 23, and then is transferred to the CPU 23.

The CPU 23 accepts the digital pulse voltage and operates the indicator of the liquid level gauge 24. As a result, the liquid level gauge 24 is able to indicate the liquid level. Patent Literature 1: JP-A-2001-171366.

However, in order to operate the liquid level gauge 15 based on the digital pulse in the liquid level measuring system having the resistance type sensor 11 in the prior art, (a) the input circuit 13 of the measuring device main body 12 shown in FIG. 7 must be changed to the complicated input circuit 22 in the measuring device main body 21 shown in FIG. 11, and (b) a software (the data table in FIG. 8) of the CPU 14 must be changed to a software (the data table in FIG. 13) of the CPU 23.

Such massive change is required of the hardware and the software, and thus such change is a serious obstacle to newly load the hardware and the software in the existing vehicle or load the hardware and the software in the newly developed vehicle. As a result, such a problem existed that the above obstacle constitutes a factor that delays quality improvement (non-contact measuring approach) of the liquid level measuring system.

SUMMARY OF THE INVENTION

The present invention intends to obtain a liquid level measuring system capable of achieving improvement of a liquid level measuring precision by preparing a non-contact type sensor while utilizing, as it is, a part of the configuration of the existing measuring device main body that receives an existing analog voltage as an input, and also facilitating the installing of the non-contact type sensor in the existing vehicle.

In order to solve the aforesaid object, the invention is characterized by having the following arrangement.

(1) A liquid level measuring system comprising:
a non-contact type sensor that measures a liquid level in a non-contact fashion and outputs a measured values as a digital pulse;
a sensor-output converting circuit that converts the digital pulse into an analogue voltage that corresponds to a duty factor of the digital pulse; and
a central processing unit that receives the analogue voltage and controls an operation of a liquid level gauge according to the analogue voltage.

(2) The liquid level measuring system according to (1), wherein the sensor-output converting circuit includes a low-pass filter and an amplifier which output the analogue voltage that is in proportion to the duty factor of the digital pulse.

(3) The liquid level measuring system according to (1), wherein the non-contact type sensor includes a hole IC for sensing the liquid level as a sensed signal and converting the sensed signal into the digital pulse.

(4) The liquid level measuring system according to (3), wherein the non-contact type sensor includes a memory that stores data indicating the duty factor of the digital pulse, which corresponds to the sensed signal.

(5) The liquid level measuring system according to (4), wherein the memory comprises a memory device in which the duty factor of the digital pulse is rewritable.

According to the above configuration, a high-precision measurement of the liquid level utilizing the central processing unit of the existing measuring device main body can be attained only by converting the digital pulse of the liquid level measured by the non-contact type sensor into the analogue signal. Therefore, the defective contact of the contact, and the like generated when the resistance type sensor is used can be prevented, and also the installing in the newly developed vehicle and the new installing in the existing vehicle can be attained.

According to the above configuration, measurement of the liquid level utilizing the existing measuring device main body can be executed simply and inexpensively based on the digital pulse output from the non-contact type sensor only by providing the low-pass filter and the amplifier.

According to the above configuration, the analogue voltage that corresponds to the duty factor of the digital pulse output from the non-contact type sensor can be input into the existing central processing unit, and also the liquid level measuring precision can be enhanced easily with a simple configuration.

According to the above configuration, the digital pulse the duty factor of which corresponds to the characteristics of the existing measuring device main body and the circuits in the measuring device main body can be output easily from the non-contact type sensor.

According to the present invention, the sensor-output converting circuit used in the duty factor-voltage conversion is connected to the existing measuring device main body. As a result, high-precision measurement of the liquid level using the non-contact type sensor can be accomplished simply and inexpensively, and also the new installing of the non-contact type sensor in the existing vehicle can be attained easily.

DETAILED DESCRIPTION OF PREFERRED EMBODIMENTS

An embodiment of the present invention will be explained with reference to the drawings hereinafter.

Figure 1:
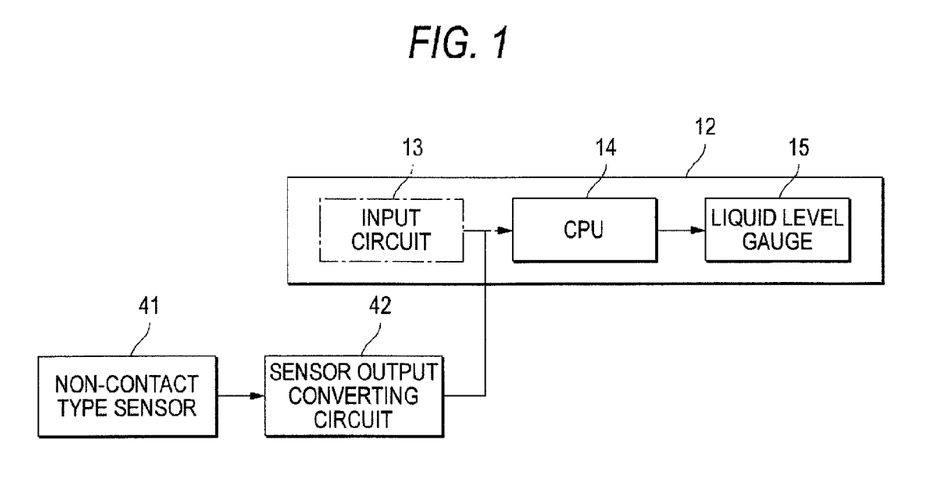
FIG. 1 is a block diagram showing a liquid level measuring system according to an embodiment of the present invention.

FIG. 1 is a block diagram showing a liquid level measuring system according to the present invention. This liquid level measuring system is composed of a non-contact type sensor 41, a sensor output converting circuit 42, and the existing measuring device main body 12 shown in FIG. 6. In this case, a part of the existing measuring device main body 12 is utilized and, more particularly, the CPU 14 and the liquid level gauge 15 are utilized except the input circuit 13 indicated by a chain line.

The non-contact type sensor 41 is identical to that explained in FIG. 11, and includes the Hall IC therein. This Hall IC acts to sense a change of the liquid level as a magnetic change in a non-contact fashion, then convert the sensed signal into a digital pulse (PWM) a duty factor of which can correspond to the change, and then output the digital pulse.

Figure 2:
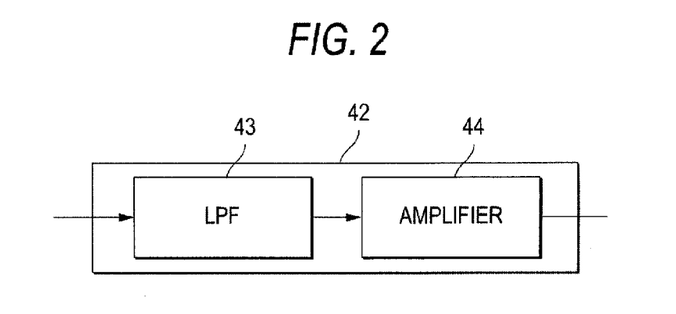
FIG. 2 is a circuit diagram showing details of a sensor output converting circuit in FIG. 1.
Figure 3:
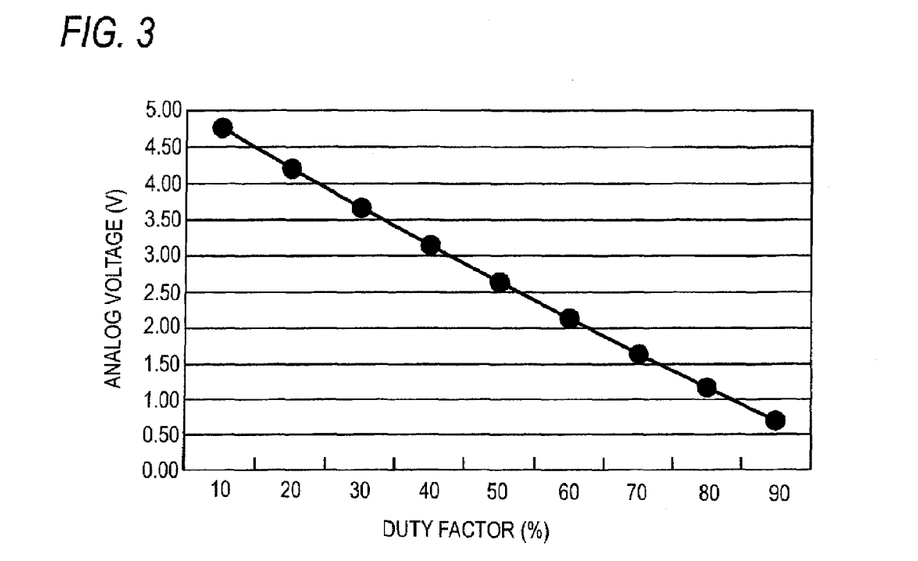
FIG. 3 is a view showing an input/output converting characteristic of the sensor output converting circuit in FIG. 1.

The sensor output converting circuit 42 is a converter that converts the digital pulse into the analogue signal, and consists of a low-pass filter 43 and an amplifier 44, which are connected as shown in FIG. 2. The sensor output converting circuit 42 outputs the analogue voltage that is in proportion to the duty factor of the digital pulse. The input/output characteristic of the sensor output converting circuit is given as shown in FIG. 3.

Figure 4:
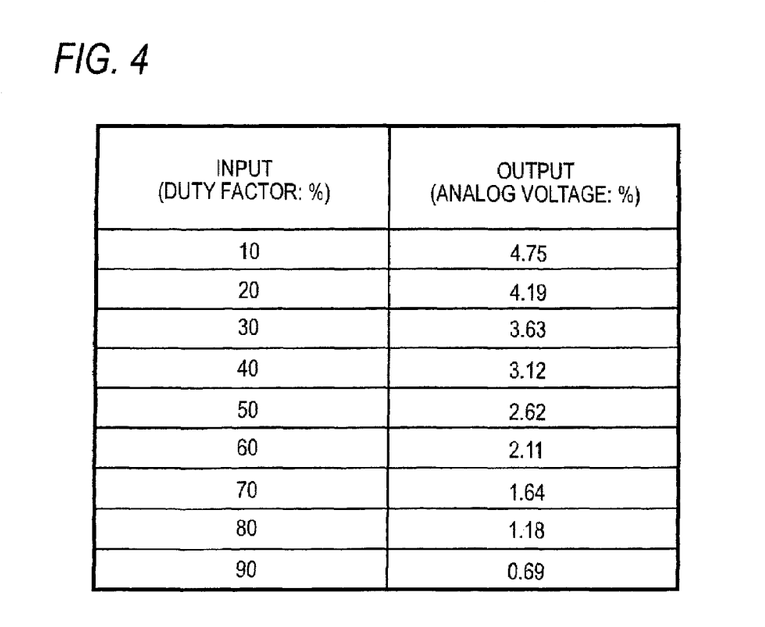
FIG. 4 is an explanatory view showing a relationship between a duty factor and an output voltage of the sensor output converting circuit obtained from the input/output converting characteristic in FIG. 3.

Here, the analog voltage is an input voltage that is similar to the input value to the CPU 14 in the existing measuring device main body 12. Therefore, the CPU 14 outputs the digital signal, which corresponds to the duty factor of the digital pulse, to the liquid level gauge 15. FIG. 4 is an explanatory view showing a correspondence between the duty factor and the output voltage obtained from the input/output characteristic in FIG. 3.

In the liquid level measuring system having such configuration, the Hall IC in the non-contact type sensor 41 generates the digital pulse having a predetermined duty factor because the float 25 moves vertically in response to the liquid level. Then, the digital pulse is input into the sensor output converting circuit 42. The sensor output converting circuit 42 executes the smoothing of the digital pulse by the low-pass filter 43, then executes the waveform shaping and amplification of the signal by the amplifier 44, and then outputs the resultant signal to the CPU 14.

The CPU 14 receives the smoothed analog output from the sensor output converting circuit 42, then generates the digital signal that is necessary for the liquid level gauge 15, and then drives (operates) the liquid level gauge 15 based on this digital signal. As a result, the liquid level gauge 15 is able to indicate the liquid level precisely and automatically in a digital fashion, based on the digital pulse that is output in response to the vertical movement of the float 25, i.e., in response to the liquid level.

In this embodiment, the input circuit 13 in the existing measuring device main body 12 is disused, and thus a cost of the sensor output converting circuit 42 can be cancelled by a cost reduction of the input circuit 13. Therefore, a cost obligation attendant upon improvement of the liquid level measuring precision is seldom generated.

The liquid level measuring system utilizes a part of the existing measuring device main body 12, and operates the liquid level gauge 15 based on the digital pulse output of the non-contact type sensor 41. Therefore, the liquid level gauge 15 in the existing measuring device main body 12 having the input circuit 13 can be operated by fitting the non-contact type sensor 41 into the existing vehicle.

Figure 5A:
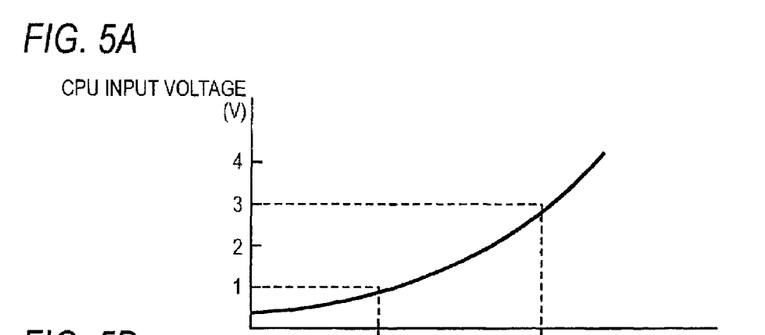
FIGS. 5A and 5B are characteristic views showing an input voltage and a duty factor in response to a change of a capacity to explain a method of calculating the duty factor responding to the input voltage of an existing CPU.
Figure 5B:
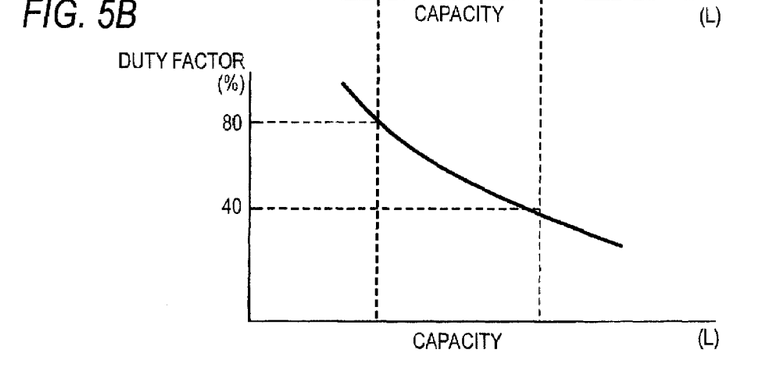

In this case, a relationship between the input voltage of the CPU and the duty factor, which is similar to the relationship shown in FIG. 3, can be derived based on a characteristic of the input voltage of the CPU 14 to a change of the capacity in the existing measuring device main body 12, as shown in FIG. 5A, and a characteristic of the duty factor of the non-contact type sensor 41 to a change of the capacity, as shown in FIG. 5B, both characteristics being derived by the experiments.

The relationship is loaded in the memory built in the Hall IC to output the duty factor derived in this manner.

The data indicating the correspondence between the duty factor and the magnetic change generated by the turn of the magnet are rewritable in the memory. Therefore, the duty factor that can correspond to the characteristic of the existing measuring device main body 12 can be output from the non-contact type sensor 41. As a result, the measuring precision can be enhanced by employing the non-contact type sensor 41, which has a function equivalent to that of the existing resistance type sensor 11, without modification of the circuit, or the like.

In case the non-contact type sensor 41 is newly loaded in the existing measuring device main body 12 of the existing vehicle in this manner, the input circuit 13 in the existing measuring device main body 12 can be separated from the CPU 14.

In the above, explanation is made mainly of the case where the fuel level in the fuel tank of the car is to be measured. In this event, when a liquid level of various liquids such as the water, the oil, and the like is to be measured, the above configuration can also be employed and thus the similar operations and advantages can also be achieved.

As described above, according to the present invention, either the non-contact type sensor and the sensor output converting circuit are added to the existing liquid level measuring system or the duty factor of the digital pulse that corresponds to the input voltage of the CPU is loaded in the memory that is built in the added non-contact type sensor. As a result, the liquid level measuring system of high measuring precision can be accomplished inexpensively by modifying the existing liquid level measuring system in a small scale.

What is claimed is:

1. A liquid level measuring system comprising:
    a non-contact type sensor that measures a liquid level in a non-contact fashion and outputs a digital pulse;
    a sensor-output converting circuit that converts the digital pulse into an analogue voltage that corresponds to a duty factor of the digital pulse by using a relationship between the analogue voltage and the duty factor, said relationship being stored in a memory;
    a measuring device main body that receives the analogue voltage as a measurement signal; and
    a central processing unit that is disposed in the measuring device main body, receives the analogue voltage and outputs a digital signal to control an operation of a liquid level gauge according to the analogue voltage.

2. The liquid level measuring system according to claim 1, wherein the sensor-output converting circuit and the non-contact type sensor are not disposed in the measuring device main body.

3. The liquid level measuring system according to claim 1, wherein the non-contact type sensor includes a Hall IC for sensing the liquid level as a sensed signal and converting the sensed signal into the digital pulse.

4. The liquid level measuring system according to claim 3, wherein the memory comprises a memory device in which the duty factor of the digital pulse is rewritable.

5. The liquid level measuring system according to claim 1, wherein the relationship is derived according to a characteristic of each of a plurality of output voltages to a change in the liquid level and a characteristic of each of a plurality of duty factors to the change in the liquid level.

6. The liquid level measuring system according to claim 5, wherein the relationship is determined before measuring the liquid level.

7. The liquid level measuring system according to claim 5, wherein the relationships is rewritable in said memory.

8. A liquid level measuring system comprising:
    a sensor that measures a liquid level in a non-contact fashion and outputs a corresponding digital pulse;
    a converting circuit that converts the digital pulse into a voltage that corresponds to a duty factor of the digital pulse by using a relationship between the voltage and the duty factor, said relationship being stored in a memory;

a measuring device main body that receives the voltage as a measurement signal; and a central processing unit that is disposed in the measuring device main body, receives the voltage and outputs a digital signal to control an operation of a liquid level gauge according to the voltage, wherein the voltage represents the liquid level.

9. The liquid level measuring system according to claim 8, wherein the converting circuit and the sensor are not disposed in the measuring device main body.

10. The liquid level measuring system according to claim 8, wherein the relationship is derived according to a characteristic of each of a plurality of output voltages to a change in the liquid level and a characteristic of each of a plurality of duty factors to the change in the liquid level.

11. The liquid level measuring system according to claim 10, wherein the relationship is determined before measuring the liquid level.

12. The liquid level measuring system according to claim 10, wherein the relationship is rewritable in said memory.

* * * * *